(12) United States Patent
Kumar et al.

(10) Patent No.: US 9,734,165 B2
(45) Date of Patent: Aug. 15, 2017

(54) METHOD AND DEVICE FOR CONTACTLESS BIOMETRICS IDENTIFICATION

(71) Applicant: The Hong Kong Polytechnic University, Hong Kong (HK)

(72) Inventors: Ajay Kumar, Hong Kong (HK); Qian Zheng, Hong Kong (HK)

(73) Assignee: The Hong Kong Polytechnic University, Hung Hom, Kowloon (HK)

( * ) Notice: Subject to any disclaimer, the term of this patent is extended or adjusted under 35 U.S.C. 154(b) by 0 days.

(21) Appl. No.: 14/798,573

(22) Filed: Jul. 14, 2015

(65) Prior Publication Data

US 2016/0070980 A1   Mar. 10, 2016

Related U.S. Application Data

(60) Provisional application No. 62/032,528, filed on Aug. 2, 2014.

(51) Int. Cl.
*G06K 9/00* (2006.01)
*G06F 17/30* (2006.01)
(Continued)

(52) U.S. Cl.
CPC ....... *G06F 17/30259* (2013.01); *G06K 9/001* (2013.01); *G06K 9/0008* (2013.01); *G06K 9/00033* (2013.01); *G06K 9/00255* (2013.01); *G06K 9/4661* (2013.01); *G06T 5/002* (2013.01); *G06T 2207/20056* (2013.01)

(58) Field of Classification Search
None
See application file for complete search history.

(56) References Cited

U.S. PATENT DOCUMENTS 6,404,904 B1 *   6/2002   Einighammer ........... G01J 4/00
                                                      356/71
7,496,214 B2 *   2/2009   Zhang ............... G06K 9/00067
                                                      340/5.53
(Continued)

OTHER PUBLICATIONS

A contactless biometric system—features, Goh et al., Researchgate, 2011, pp. 155-178.*

(Continued)

*Primary Examiner* — Jayesh A Patel
(74) *Attorney, Agent, or Firm* — Spruson & Ferguson (Hong Kong) Limited

(57) ABSTRACT

The present invention provides a new method and a device for the contactless human identification using biometrics images. The present invention develops a robust feature extraction algorithm to recover three-dimensional (3D) shape information from biometrics images. Further, it provides significantly improved performance than what is possible from the state-of-art methods, adding practicality for real applications on mobile platform, smartphones, and also as add-on system for conventional fingerprint system. The present invention's unique advantages are based on its computational simplicity, efficient matching and requiring least storage. Experiments were conducted to confirm very high accuracy and reliability on a number of biometric modalities including iris, palmprint, and finger knuckle images.

12 Claims, 10 Drawing Sheets

(51) Int. Cl.
*G06T 5/00* (2006.01)
*G06K 9/46* (2006.01)

(56) References Cited

U.S. PATENT DOCUMENTS

| | | | | |
|---|---|---|---|---|
| 7,995,808 B2* | 8/2011 | Rowe | ............... | G06K 9/00033 382/124 |
| 8,175,346 B2* | 5/2012 | Rowe | ............... | G06K 9/00013 340/5.53 |
| 8,229,178 B2* | 7/2012 | Zhang | ............... | G06K 9/00067 348/77 |
| 8,317,325 B2* | 11/2012 | Raguin | ............... | G06K 9/0061 351/205 |
| 2005/0226474 A1* | 10/2005 | Merbach | ............ | G06K 9/00033 382/124 |
| 2008/0101664 A1* | 5/2008 | Perez | ............... | G06K 9/00033 382/125 |

OTHER PUBLICATIONS

Score based biometric template selection and update, Jianping et al., IEEE, 978-0-7695-3431-2, 2008, pp. 35-40.*
Ordinal palmprint representation fro personal identification., Sun et al., IEEE, 1063-6919, 2005, pp. 1-6.*
S. S. Stevens, "On the theory of scales of measurement," Science, vol. 103, No. 2684, pp. 677-680, 1946.
P. Sinha, "Qualitative representations for recognition," Proc. BMCV 2002, LNCS 2525, pp. 249-262. Springer, 2002.
K.-C. Lee, J. Ho, and D. J. Kriegman, "Acquiring linear subspacefor face recognition under variable lighting," IEEE Trans. Patt. Anal. Mach. Intell., vol. 27, pp. 684-698, No. 5, May 2005.
R. Basri, D. W. Jacobs, "Lambertian reflectance and linear subspaces," IEEE Trans. Patt. Anal. Mach. Intell., vol. 25, No. 2, pp. 218-232, Feb. 2003.
J. Daugman, "The importance of being random: statistical prin ciples of iris recognition," Pattern Recognition, vol. 36, pp. 279-291, 2003.
W. Jia, D.-S. Huang, D. Zhang, "Palmprint verification based on robust line orientation code," Pattern Recognition, vol. 31, No. 5, pp. 1504-1513, May 2008.
A. K. Jain and J. Feng, "Latent palmprint matching," IEEE Trans. Patt. Anal. Mach. Intell., vol. 31, No. 6, pp. 1032-1047, Jun. 2009.
A.-K. Kong and D. Zhang, "Competitive coding scheme for palmprint verification." Proc. ICPR 2004. pp. 520-523, Aug. 2004.
Z. Sun and T. Tan, "Ordinal measures for iris recognition," IEEE Trans. Patt. Anal. Mach. Intell., vol. 31, pp. 2211-2226, 2009.
Z. Sun, T. Tan, Y. Wang, and S. Z. Li, "Ordinal palmprint represen-tion for personal identification," Proc. CVPR 2005, pp. 279-284, 2005.
X. Tan and B. Triggs, "Enhanced local texture feature sets for face recognition under difficult lighting conditions," IEEE Trans. Image Processing, vol. 19, pp. 1635-1650, Jun. 2010.
B. Zhang, Y. Gao, S. Zhao, and J. Liu, "Local derivative pattern versus local binary pattern: face recognition with high-order local pattern descriptor," IEEE Trans. Image Processing, vol. 19, No. 2, pp. 533-544, Feb. 2010.
D. Zhang, W.-K. Kong, J. You, and M. Wong, "Online palmprint identification," IEEE Trans. Patt. Anal. Mach. Intell., vol. 29, No. 9, pp. 1041-1050, Sep. 2003.
Y. Song, C. Lee and J. Kim, "A new scheme for touchless fingerprint recognition system," Proc. 2004 International Symposium on Intel-ligent Signal Processing and Communication Systems, pp. 524-527, 2004.
A.Kumar, "Importance of being unique from finger dorsal patterns: Exploring minor finger knuckle patterns in verifying human iden-tities," IEEE Trans. Information Forensics & Security, vol. 9, pp. 1288-1298, Aug. 2014.

* cited by examiner

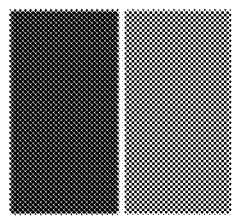 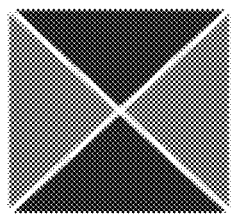 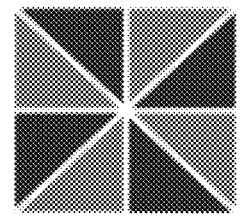
FIG. 3a  FIG. 3b  FIG. 3c
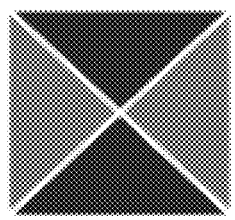 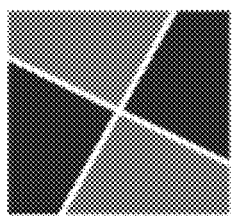 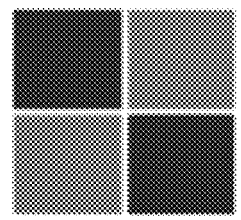
FIG. 3d  FIG. 3e  FIG. 3f
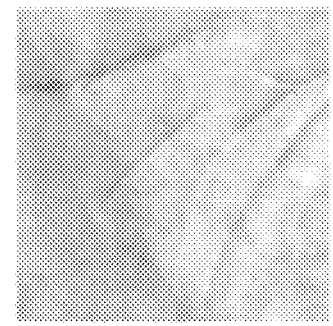 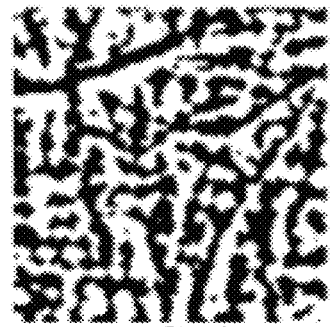
FIG. 4a  FIG. 4b

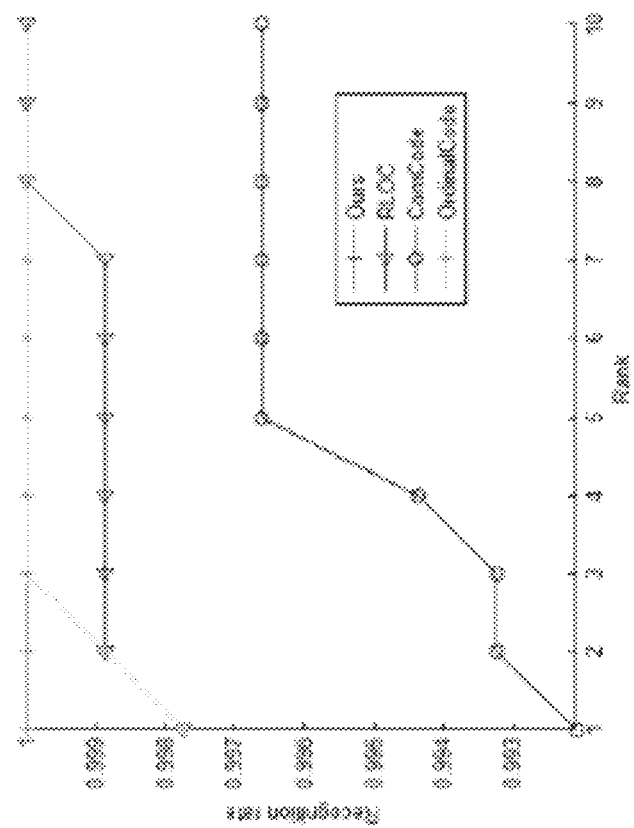
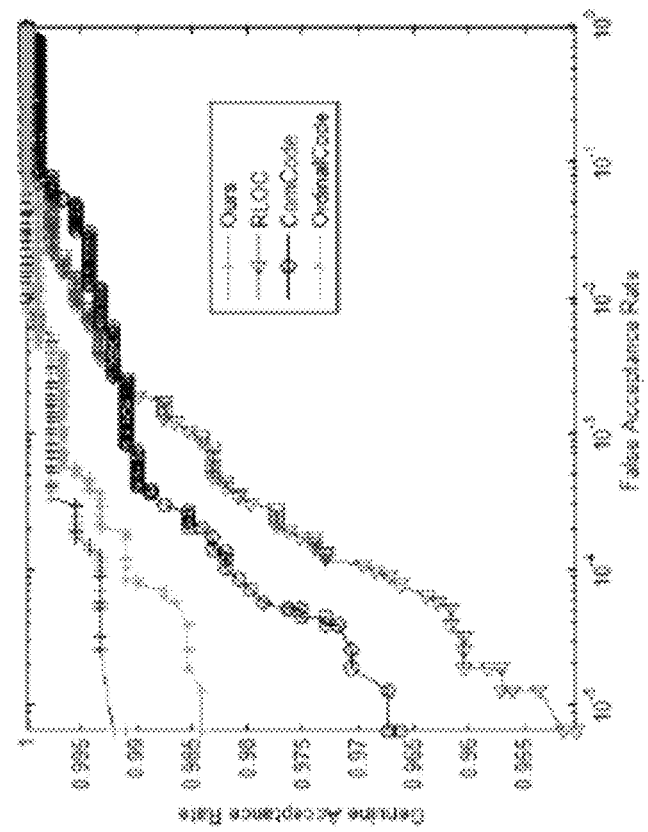
FIG. 6b
FIG. 6a

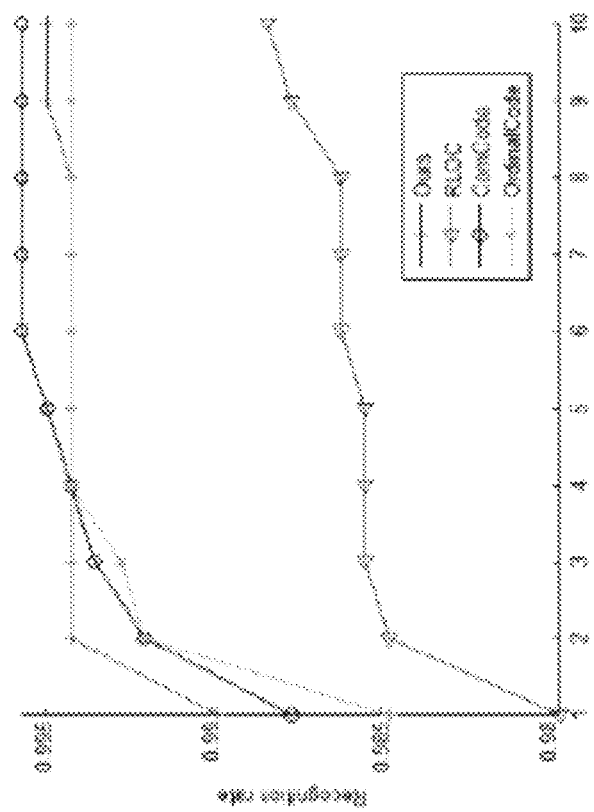
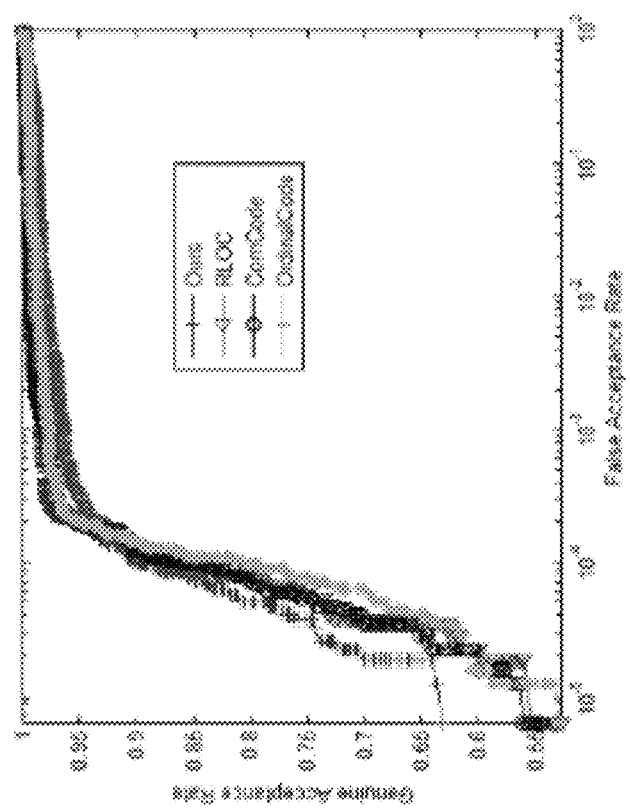
FIG. 7a
FIG. 7b

METHOD AND DEVICE FOR CONTACTLESS BIOMETRICS IDENTIFICATION

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent Office patent file or records, but otherwise reserves all copyright rights whatsoever.

CLAIM FOR DOMESTIC PRIORITY

This application claims priority under 35 U.S.C. §119 to the U.S. Provisional Patent Application No. 62/032,528 filed Aug. 2, 2014, the disclosure of which is incorporated herein by reference in its entirety.

FIELD OF THE INVENTION

The present invention relates generally to biometrics based human identification. More particularly, the present invention relates to methods and devices providing contactless biometrics identification.

BACKGROUND

The following references are cited in the specification. Disclosures of these references are incorporated herein by reference in their entirety.

LIST OF REFERENCES

[1] S. S. Stevens, "On the theory of scales of measurement," *Science*, vol. 103, no. 2684, pp, 677-680, 1946.
[2] P. Sinha, "Qualitative representations for recognition," Proc. BMCV 2002, LNCS 2525, pp. 249-262. Springer, 2002.
[3] K.-C. Lee, J. Ho, and J. Kriegman, "Acquiring linear subspace for face recognition under variable lighting," *IEEE Trans. Patt. Anal. Mach. Intell.*, vol. 27, pp. 684-698, no. 5, May 2005.
[4] W. Jia, D.-S. Huang, D. Zhang, "Palmprint verification based on robust line orientation code," *Pattern Recognition*, vol. 0.31 no. 5, pp. 1504-1513, May 2008.
[5] A. K. Jain and J. Feng, "Latent palmprint matching," *IEEE Trans. Patt. Anal. Mach. Intell.*, vol. 31, no. 6, pp. 1032-1047, June 2009.
[6] A.-K. Kong and D. Zhang, "Competitive coding scheme for palmprint verification." *Proc. ICPR* 2004. pp. 520-523, August 2004.
[7] Z. Sun and T. Tan, "Ordinal measures for iris recognition," *IEEE Trans. Patt. Anal. Mach. Intell.*, vol. 31, pp. 2211-2226, 2009.
[8] Z. Sun, T. Tan, Y. Wang, and S. Z. Li, "Ordinal palmprint representation for personal identification," *Proc. CVPR* 2005, pp. 279-284, 2005.
[9] X. Tan and B. Triggs, "Enhanced local texture feature sets for face recognition under difficult lighting conditions," *IEEE Trans. Image Processing*, vol 19, pp. 1635-1650, June 2010.
[10] B. Zhang, Y. Gao, S. Zhao, and J. Liu, "Local derivative pattern versus local binary pattern: face recognition with high-order local pattern descriptor," *IEEE Trans. image Processing*, vol. 19, no. 2, pp. 533-544, February 2010.
[11] D. Zhang, W.-K. Kong, J. You, and M. Wong, "Online palmprint identification," *IEEE Trans. Patt, Anal. Mach. Intell.*, vol. 29, no. 9, pp. 1041-1050, September 2003.
[12] D. Zhang, G. Lu, Z. Guo, N. Luo, "Method and apparatus for personal identification using palmprint and palm vein," U.S. Pat. No. 8,229,178, 2012.
[13] A. Parez, "Non-contact optical means and method for 3D fingerprint recognition," US Patent Application No. 2008/0101664A1, May 2008.
[14] P. Vii. Merbach, R. Hauke, and P. Maschotta, "Touchless Biometric Recognition," US Patent No. 20050226474, 2005.
[15] H. J. Einighammer, and J. Einighammer, "System for the touchless recognition of hand and finger lines," U.S. Pat. No. 6,404,904, June 2002.
[16] Y. Song, C. Lee and J. Kim, "A new scheme for touchless fingerprint recognition system," *Proc.* 2004 *International Symposium on Intelligent Signal Processing and Communication Systems*, pp. 524-527, 2004.
[17] A. Kumar, "Importance of being unique from finger dorsal patterns: Exploring minor finger knuckle patterns in verifying human identities," *IEEE Trans. Information Forensics & Security*, vol. 9, pp. 1288-1298, August 2014

Biometrics based human identification is one of the most critical and challenging tasks to meet in the growing demand for stringent security. Traditional acquisition of contact-based handprints or finger prints by pressing the hands or fingers against the hard surface of a sensor or scanner often results in partially degraded images due to deformations, slippages, smearing or due to sensor noise. As a result, full potential of biometric modality is not realized. Therefore contactless imaging of hand biometrics has emerged to provide a solution to aforesaid intrinsic problems. Contactless imaging of biometrics like face, iris, or knuckle patterns is also perceived to be more hygienic and provides more accurate personal identification as rich information is available from the three-dimensional (3D) imaged biometrics surfaces.

The main obstacles of these emerging 3D biometrics technologies to replace the conventional two-dimensional (2D) biometrics systems are generally their bulky size and high cost, which mainly resulted from the usage of structured lighting system and/or multiple cameras. The present invention primarily addresses such limitations in the state-of-the-art for 3D biometrics technologies. Capability to recover 3D shape information from 2D images delivered from the present invention will have multifaceted applications in many disciplines from law-enforcement to electronic commerce.

Stevens [1] classified the scale of measurement into four stages: nominal, ordinal, interval, and ratio measure. Measurement which is relative to ordering or ranking is referred to as the ordinal measure. Ordinal measure is very simple and describes relative information. For example, given two persons, it can easily be found out which person is taller but it can hardly be told how tall they are exactly.

Sinha [2] believed that ordinal measure can only be used for simple detection or classification task and it should be impossible to use ordinal measure alone to solve complex object recognition problems, since ordinal measure loses some numerical information. However, Sun et at. [7]-[8] demonstrated that the ordinal measure can play a defining role for the complex iris recognition and palmprint recognition problems. They achieved significant performance improvement over competing results developed in the literature. In the palmprint matching, feature or template of a palmprint image is usually a feature matrix [4]-[6], [8], [11]. Each entry on the matrix is an encoded feature code. Distance between two templates is defined as the sum of distance between such codes. Hamming distance is usually employed to measure the codes' distance as the codes are often binarized. In ordinal measure, the number of encoding classes for each code is 2 while in CompCode [6] or BLOC [4], the encoding classes is 6. US Patent office has issued a number of patents for palmprint identification. U.S. Pat. No. 7,496,214 describes a system for palmprint identification using CompCode [6]. This method is also used in palm-vein identification system detailed in U.S. Pat. No. 8,229,178 [12]. U.S. Patent Application Publication No. 2008/0101664 [13] describes a new non-contact means for 3D fingerprint identification. Some other conventional contactless 2D biometrics matching methods appear in [14]-[16].

In order to improve the accuracy of fingerprint identification, new touchless fingerprint identification techniques, that reconstruct and exploit the 3D distribution of finger ridge pattern discontinuities, have been recently proposed. These techniques essentially view the scanning of live 3D fingerprints as a 3D surface reconstruction problem. The techniques emerged so far for recovering 3D fingerprint features employ common vision-based 3D reconstruction algorithms, including stereo vision using structured lighting and shape from silhouette In the frontier of developing touchless 3D fingerprinting, two universities (Carnegie Mellon University and University of Kentucky) and their respective start-up companies (TBS Holding and Flashscan 3D) have recently developed such commercial solutions. The core technology of TBS is based on the shape from silhouette, which uses a multi-view system to acquire images of the finger under different viewpoints and illuminations. The corresponding silhouettes are extracted for the 3D modeling of the fingerprint images. The core technology of Flashscan 3D is based on the high-speed structured lighting through phase measuring profilometry which is constructed for the 3D scanning of finger surface. Both of these systems have demonstrated to achieve high-speed response time and higher recognition rates than the current 2D fingerprint systems.

There are several promising references [13]-[14] which detail such contactless 3D fingerprint techniques and also the proposed fingerprint unwrapping models for corresponding approaches. The main obstacle of these emerging 3D fingerprint technologies to replace the conventional 2D fingerprint system is related their bulk and high cost, which mainly results from the usage of structured lighting system or multiple cameras. In TBS's Surround Imager System, 5 cameras are required. While in Flashcan3D's system, a specialized projector and a high-speed camera to implement the 3D scanning. Therefore, advanced capability to develop low-cost solution for recovering 3D shape information will significantly enhance the applicability of contactless biometrics technologies in wide range of civilian and commercial applications.

Regardless of few recent innovations, the main obstacle in replacing conventional 2D biometrics systems with the touchless 3D biometrics technologies, is their cost and bulk, which is mainly contributed from the usage of (i) structured lighting system or (ii) multiple cameras. This invention is to address such key limitations of the current 3D biometrics technologies by developing a novel 3D feature descriptor and matching model that can recover 3D shape from biometrics characteristics being imaged.

SUMMARY

It is an objective of the present invention to provide a more accurate, compact, and faster method and device of feature recovery algorithms for contactless biometrics identification. In the context of advancements in the matching of 2D biometrics images, the present invention introduces new algorithms to significantly improve feature extraction and matching techniques for the contactless palmprint identification.

In accordance to an embodiment of the present invention, a 3D feature descriptor is provided based on relative algorithmic measurements, which can be extracted from contactless 2D biometrics image(s) (palmprint, iris, finger knuckle, face, etc.). This kind of feature describes the 3D shape information on the surface of 3D biometric imaged. It is robust to illumination changes, which are frequent in contactless biometrics imaging. The outperforming experimental results, presented in Section G of this document on multiple publicly available biometric databases, verify the theoretical arguments, which are used to develop new 3D information descriptor.

BRIEF DESCRIPTION OF THE DRAWINGS

Embodiments of the invention are described in more detail hereinafter with reference to the drawings, in which

FIG. 3a illustrates a first configuration of a filter in accordance to one embodiment of the present invention, FIG. 3b illustrates a second configurations of the filter, FIG. 3c illustrates a third configurations of the filter; FIG. 3d illustrates a forth configurations of the filter, FIG. 3e illustrates a fifth configurations of the filter, and FIG. 3f illustrates a sixth configurations of the filter;

FIG. 4a shows a typical palmprint ROI image, and FIG. 4b shows its encoded feature representation extracted by the filter in accordance to one embodiment of the present invention and of which configurations are shown in FIGS. 3a-3f;

FIG. 6a depicts the ROC curve, and FIG. 6b depicts the CMC curve of the experiment conducted using sample palmprint images in the PolyU Contactless 2D/3D Palmprint Database;

FIG. 7a depicts the ROC curve, and FIG. 7b depicts the CMC curve of the experiment conducted using sample palmprint images in the IITD Palmprint Database;

DETAILED DESCRIPTION

In the following description, methods, systems, and devices of contactless biometrics identification and the like are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

In accordance to one aspect of the present invention, the low-cost contactless biometrics matching system uses low-cost imaging camera, which can also be integrated with existing slap fingerprint devices used for the law-enforcement (immigration crossings, Nation ID cards, etc.). This system uses an unique feature recovery and matching algorithm, which recovers 3D shape information from contactless 2D images and efficiently encodes using specially designed filters.

A. RELATIVE PIXELS MEASUREMENTS IN ORTHOGONAL DIRECTIONS

The present invention explores relative measurements, referred to as explore ordinal measurements [1]-[2]. The Lambertian model is utilized to describe typical contactless imaging for the palmprint biometric modality. Using the Lambertian model, the pixel value I(i, t) in image I at point $P_i$ is jointly determined by reflectance $k_d$, illumination intensity $l_d$, illumination direction vector $L^1$ and point normal vector $N_i$.

$$I(i,t) = k_d l_d L N_i \quad (1)$$

Figure 1:
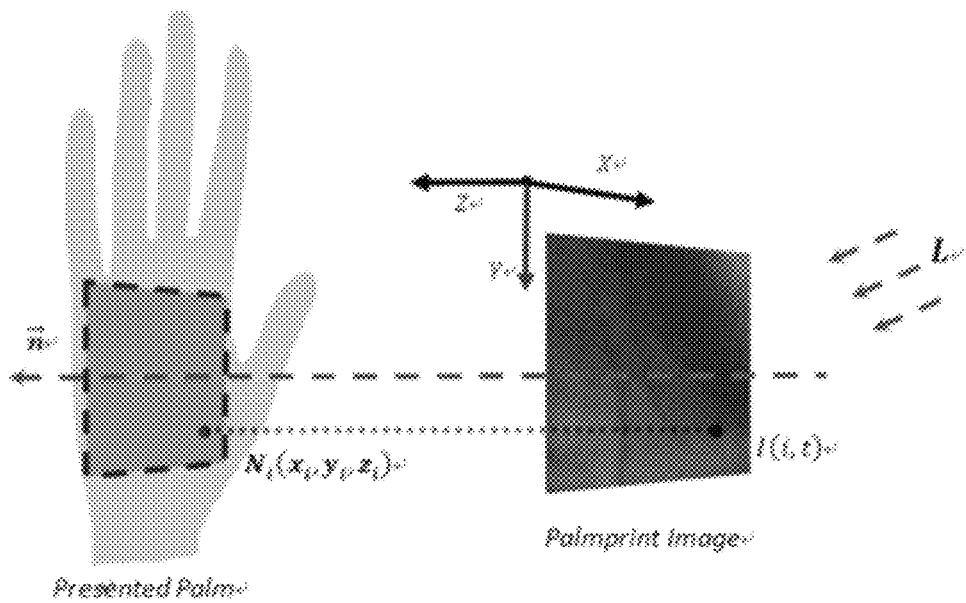
FIG. 1 illustrates that contactless palmprint imaging often requires that the illumination source be positioned in the front (no illumination from the back)

The objects like palmprint or human faces, whose imaged surface can be considered close to being flat, a reasonable assumption' for the illumination direction L is that the object is not illuminated from behind the surface (front lighting shown in FIG. 1 for palm imaging). The acquired images from x-y plane, using Cartesian coordinates, are analyzed with the normal of image surface $\vec{n}$ representing z-axis as shown in FIG. 1. An assumption is made which mandates that the product of vector L and $\vec{n}$ will always be positive.

[1] Assuming that the illumination from all point sources are the same, i.e., L(i,t)≈L.
[2] Especially for biometrics imaging/applications where camera is placed normal to the X-Y plane.

In order to minimize or eliminate the adverse impact of illumination variations during the contactless biometrics imaging, recovery of relatively stable features using ordinal measurements in the same direction as the surface normal or opposite to the surface normal is considered. In other words, if the feature represents the direction approximate to the direction of image plane normal, this feature is represented or encoded with the value 1 otherwise 0. Under the Cartesian coordinate representation shown in figure, the direction of vector $\vec{Z}$ is same as the image plane normal n. Therefore, the z-component of point normal vector $N_i$ is chosen to represent our feature.

It is further defined point normal $N_i(x_i, y_i, z_i)$ s.t. $x_i^2 + y_i^2 + z_i^2 = 1$. According to the above analysis, it is encoded the feature $F_i$ at point $p_i$ as follows:

$$F_i = \tau(Z_{i,1} - Z_{i,2}) \quad (2)$$

where $\tau(\alpha)$ is the encoding function and is defined as $$\tau(a) = \begin{cases} 0, & \alpha < 0 \\ 1, & \alpha \geq 0 \end{cases} \quad (3)$$

$Z_{i,j}$ represents the z component of $N_n$ $$Z_{i,j} = \tau_{P_n \in S_{i,j}} z_n, j \in \{1,2\} \quad (4)$$

$S_{i,j}$ is the $j^{th}$ subset of the neighboring points of $P_i$.

B. 3D BIOMETRIC SHAPE FROM TEXTURE DETAILS

To systematically describe how the 3D shape information (z-component of information as described above) is recovered in the present invention from the texture-like details observed in the 2D images: firstly, Lambertian surface assumption is used to build 2D imaging model for the shape recovery analysis; then a reliability constraint is developed to ascertain the reliability in recovering such 31) shape information; finally, the developed feature extraction method is described.

C. RELATIVE PIXEL MEASUREMENT WITH LAMBERTIAN MODEL

Further to the analysis in Section A, the feature to be recovered is a kind of relative or ordinal measurement and is defined in the following. Suppose there are two images $I(t_1)$ and $I(t_2)$ acquired from the same object, under different illumination $L(t_1)$ and $L(t_2)$ respectively at time $t_1$ and $t_2$. $R_1$, $R_2$ are two small regions on the subject, the ordinal measurement between $R_1$ and $R_2$ in image $I(t_k)$ can be defined as $$OM_k(R_1, R_2) = \tau(S(R_1, t_k) - S(R_2, t_k)) \quad (5)$$

where $S(R_j, t_k)$ is some arithmetic function of pixel values in region $R_j$ on image $I(t_k)$ and can also be manually defined. In previous work which is related to ordinal measure for the recognition [7]-[8], $S(R_j, t_k)$ is defined as weighted summation function $$S(R_j, t_k) = \Sigma_{P_i \in R_j} W_{i,j} I(i, t_k) \quad (6)$$

If $OM_1(R_1, R_2)$ is always equal to $OM_2(R_1, R_2)$, the impact of illumination will be eliminated. When $R_1$ and $R_2$ are small and close, it is assumed $k_d$ and $l_d$ are unchanged and can be seen as constants. Combining Equation (1), $OM_k(R_1, R_2)$ can be rewritten as $$OM_k(R_1, R_2) = \tau(L(t_k) \delta(R_1, R_2)). \quad (7)$$

where $$\delta(R_1, R_2) = \Sigma_{P_i \in R_1} W_{i,1} N_i - \Sigma_{P_i \in R_2} W_{i,2} N_i \quad (8)$$

The results from the ordinal measurements $OM_k (R_1, R_2)$ are determined by the angle between illumination vector $L(t_k)$ and $\delta(R_1, R_2)$. In the present invention all the weights are fixed as one for two key reasons:

1. $L(t_k)$ in (13) is the illumination direction vector and can be arbitrary. Therefore different weights for different points are not useful to robustly recover ordinal measure (13) while making the analysis more difficult,
2. The weights are for the point normals in essence. All points normal should be treated equally and it is not meaningful to give the point normals different weights.

D. RELIABILITY CONSTRAINT

Defining, $R_2$) for the region ($\Delta X$, $\Delta Y$, $\Delta Z$), where $$\Delta X = \tau_{P_i \in R_1} x_i - \Sigma_{P_i \in R_2} x_i$$

$$\Delta Y = \tau_{P_i \in R_1} y_i - \Sigma_{P_i \in R_2} y_i$$

$$\Delta Z = \tau_{P_i \in R_1} z_i - \Sigma_{P_i \in R_2} z_i \qquad (9)$$

Let $L(t_k) = (a_k, b_k, c_k)$, then $$\tau(L(t_k)\delta(R_1, R_2)) = \tau(\Delta X a_k + \Delta Y b_k + \Delta Z c_k) \qquad (10)$$

According to the assumption for $L(t_k)$, under the frontal illumination from the coordinates shown in FIG. 1, $c_k > 0$. When $|\Delta Z c_k| > |\Delta X a_k + \Delta Y b_k|$ is satisfied, the recovered or encoded feature is determined by the sign of $\Delta Z$, i.e., $$\tau(S(R_1, t_k) - S(R_2, t_k)) = \tau(\Delta X a_k + \Delta Y b_k + \Delta Z c_k) = \tau(\Delta Z c_k) = \tau(\Delta Z c_k) = \tau(\Delta Z) \qquad (11)$$

where $\Delta Z$ is same as $(Z_{i,1} - Z_{i,2})$ in Equation 2. It may be noted that $S(R_1, t_k) - S(R_2, t_k)$ effectively represents texture-level computation because $\Delta Z$ recovers the 3D shape information in the region $R_1$ and $R_2$. Therefore it can reasonably be said that when constraint in (11) is satisfied, the available texture-level information can be used to recover the 3D shape information.

Without loss of generality, for the case when $|\Delta X a_k| > |\Delta Y b_k|$, the constraint can be rewritten as $$\frac{|c_k|}{|a_k|} > \frac{2|\Delta X|}{|\Delta Z|} \qquad (12)$$

The experimental result on database with significant illumination changes as presented in Section G suggests that the present inventive feature of recovering the shape information is more robust to the illumination changes.

E. FEATURE EXTRACTION

The feature extraction approach is computationally simpler. The spatial regions corresponding to the given filter are divided into two subset say $R_1$ and $R_2$ in an M×N size spatial filter. All the entries in region $R_1$ are set as I and the entries in region $R_2$ are set as −1. The original image I is convoluted with this filter and the filtered image is encoded according the sign of ordinal measurement using Equation 3. Formally, the feature matrix or template from image I is generated from the feature code F(i, j) at position j) as follows:

$$F(i,j) = \tau(f * I(i,j)) \qquad (13)$$

f is the filter, * is convolution operator and I(i, j) is the pixel value at point (i, j) on image I. The division of the filter into region $R_1$ and $R_2$ can vary to accommodate for the object and/or imaging characteristics. This invention develops such a division strategy for common biometrics, such as palmprint, in Section F.

F. PALMPRINT VERIFICATION

This section focuses on the contactless palmprint verification problem. First, the geometrical properties of typical palmprint data are introduced. Then the strategy for the division the filter regions is discussed. The computation of the distance between two feature matrixes is also detailed in this section.

F.1 The Characteristics of Palmprint Data

Human palm surface is a complex 3D textured surface consisting of many ridges, wrinkles and lines [5]. The spatial extents of these key elements are different from each other. Generally ridges represent the smallest element while the wrinkles are larger than ridges, and the lines are the most remarkable features. All these key elements share the shape like a valley. The valley typically represents a symmetrical shape whose symmetry axis is the valley bottom.

Figure 2:
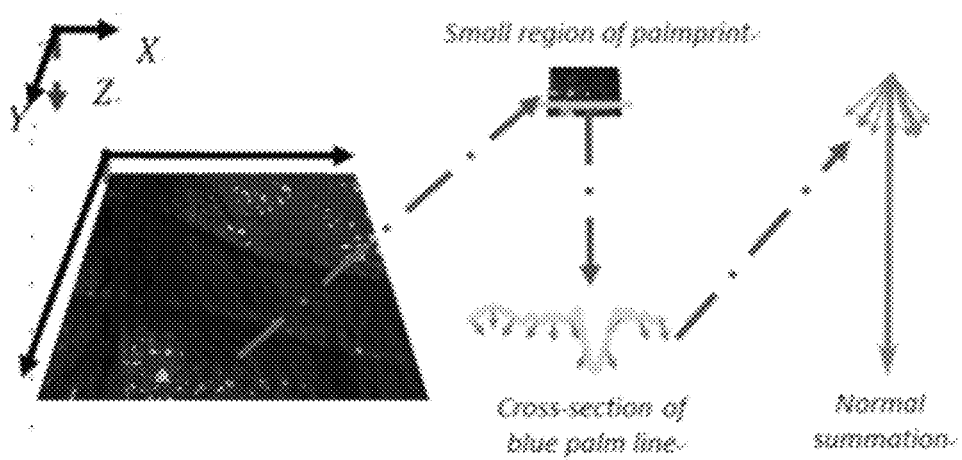
FIG. 2 illustrates the summation of points on an arbitrary palm line under typical palmprint imaging.

A 3D palm surface can be seen as a combination of several such symmetrical units, If the point normals $N_i$ which are largely symmetric to each other are combined, the azimuth components will be cancelled out or eliminated and a dominant orthonormal vector is generated, i.e., $\Sigma_{P_i \in R_i} x_i \approx 0$, $\Sigma_{P_i \in R_i} y_i \approx 0$ and $\tau \Sigma_{P_i \in R_k} z_i$ is relatively very large as $N_i(x_i, y_i, z_i)$ is the normal of point $P_i$. FIG. 2 illustrates the summation result of normals from the points on a typical palm line. For a small region on palmprint, when the orthogonal vectors for each pixel point are combined, the summation result will almost be vertical.

Considering the inequality[3] in (12), it can rewrite as $$\frac{|c_t|}{|a_t|} > \frac{2|X_1 - X_2|}{|Z_1 - Z_2|} \qquad (14)$$

where $X_1 - X_2 = \Delta X$ and $Z_1 - Z_2 = \Delta Z$.

[3] For other kind of object surfaces, such as face surface, the constraint remains unchanged while the filter division ($R_1$, $R_2$) should be carefully designed.

According to above analysis, for most of the patches[4] on palm surface, it is reasonable to write that $X_1$, $X_2 \approx 0$, and therefore $\Delta X \approx 0$. Analysis suggests that $\Delta Z$ is expected to be effective addition of several positive values. The additive result is mainly determined by size and length of effective addition of several positive values. The additive result is mainly determined by size and length of valley. Such additive result will however be irregular since the distribution of valley's is irregular and $Z_1$, $Z_2$ is not expected to be the same. Therefore, it is assumed that $\Delta Z > \phi$ ($\phi$ is a positive constant). In summary, for the patches on palmprint, $$\frac{2|X_1 - X_2|}{|Z_1 - Z_2|}$$

are largely expected to be zero and the inequality (14) is always satisfied.

[4] The rectangular region on palmprint image is referred to as patch (FIG. 4) while $R_1$ and $R_2$ are two regions on this patch.

F.2 Filter Designing

Considering the fact that binarized feature template is generated from the (contactless imaging) noisy images, the operator or the filter should be designed in such a way to even out the positive and negative filtered results from multiple pixels. This implies that the sum of all the entries in the filter be zero and the spatial distribution of 1 or -1 be symmetric and orderly. FIGS. 3a-3f illustrates some possible configurations for this filter. FIGS. 3a-3c shows three such spatial divisions with the cross or number of partitions increasing from left (1) to right (3). FIGS. 3d-3f illustrates spatial distribution of values for the three different directions of a subset when the cross number is fixed to 2. The areas of different shades of gray represent different subsets ($R_1$ and $R_2$) in the filter.

The increase in number of cross in the partitions is expected to help in suppressing the photometric distortions by balancing the filtered results from the positive and negative values. However, too many cross will make the filter rotationally sensitive, introduce asymmetry, by reducing the symmetrical property of corresponding small patches on palmprint, which will make the assumption "$X_1, X_2 \approx 0$" unreliable or invalid. Besides, too many cross will also make $\Delta Z \rightarrow 0$.

It may be noted that the symmetrical units (such as ridges, wrinkles and lines) representing dominant palmprint features are expected to have some width. The direction of intersection boundary (center or white line of the filter configurations shown in FIGS. 3a-3) also has width. In order to ensure that such inequality (20) holds good as much possible, on such symmetrical units on small patches (i.e. the small region as shown in FIG. 2), the white line in the filter configuration should be located orthogonal or parallel to the dominant symmetrical units on palmprint. Additional experimental results also support these arguments.

In accordance to one embodiment of the present invention, the second configuration (FIG. 3b) is chosen to construct the feature extractor or the filter. This filter can be defined as follows:

$$f_{i,j} = \begin{cases} 1 & |i| > |j| \\ -1 & |i| < |j| \\ 0 & \text{otherwise} \end{cases} \quad (15)$$

where i, j is the index, $i, j \in [-B, B]$. The filter size is $(2B+1) \times (2B+1)$. FIG. 4 shows a typical palmprint ROI image and its encoded feature representation extracted by this specially designed filter.

F.3 Template Denoising and Matching

In feature extraction stage, the convolution ion is applied between the filter and acquired 2D image. Analysis in previous sections suggests that it is quite unlikely that for some patches the constraint formulated in (18) may not be satisfied for two key reasons: (i) some of the patches can still have chance where $Z_1 \approx Z_2$, and (ii) when the valley falls exactly on the boundary or the edges of the filter, the filter response from the small patches (i.e. the small region as shown in FIG. 2) will no longer be symmetrical, i.e., $X_1$ and $X_2$ will not approximate to zero. In these two cases the inequality (12) will not hold good. Therefore, a denoising strategy is incorporated, for generating final matching scores from the resulting feature templates, as detailed below.

The noisy perturbations due to the limitations of the feature extractor are expected to be discretely distributed in the feature templates. In order to alleviate the unreliable codes caused by such noise, morphological operations, i.e. opening operation and closing operation, are performed since the proposed feature is binary and has spatial continuity. It is noted that this step does not increase the template size.

The final matching distance is computed by the weighted combination of three distances, $$\text{Distance}(F_T, F_S) = w_1 Dis(F_T, F_S) + w_2 Dis(\tilde{F}_T, \tilde{F}_S) + w_3 Dis(\hat{F}_T, \hat{F}_S) \quad (16)$$

where $F_T$ and $F_S$ are the original feature matrix of T and S, $\tilde{F}$ are $\hat{F}$ are the results after applying closing and opening operation on feature matrix F. Dis(A, B) is defined as:

$$Dis(A, B) = \frac{\Gamma(A \otimes B \, \& \, M(A) \, \& \, M(B))}{\Gamma(M(A) \, \& \, M(B))} \quad (17)$$

where $\otimes$ and & are XOR and AND operation, $\Lambda(A)$ computes the number of non-zero value in matrix A, $M(\cdot)$ is the mask matrix indicating the valid region on palmprint images and is define as:

$$M(P)(i, j) = \begin{cases} 0, & I_p(i, j) = 0 \quad \text{(background)} \\ 1, & \text{otherwise} \end{cases} \quad (18)$$

$I_P(i,j)$ is the pixel value of image P at position (i,j), w1, w2, w3 are the weights. In all the experiments, the weights are set as $w1:w2:w_3 = 3:1$ to consolidate the contributions from respective components. This implies that the contribution from the noise is expected to be relatively less[5] than the details. Horizontal and vertical translations are also incorporated during the matching to improve the alignment between the images/tem plates.

[5]The experimental results without using the demising strategy also validate this argument.

G. EXPERIMENTAL VALIDATION AND RESULTS

G.1 Experimental Results from the Developed Method

In this section, four different publicly available palmprint databases are used to evaluate the identification and verification performance of the present invention. These four databases are: IIT Delhi Touchless Palmprint Database (Version 1.0) provided by The Hong Kong Polytechnic University, Hong Kong; The Hong Kong Polytechnic University Contac free 3D/2D Hand images Database (Ver 1.0) provided by The Hong Kong Polytechnic University, Hong Kong; The Hong Kong Polytechnic University (PolyU) Palmprint Database provided by The Biometric Research Centre, The Hong Kong Polytechnic University; and CASIA Palmprint image Database provided by Center for Biometrics and Security Research National Laboratory of Pattern Recognition Institute of Automation, Chinese Academy of Sciences. In order to facilitate fair comparisons with prior work, different protocols on these palmprint databases are employed. Three competing methods: competitive code [6], ordinal code [8], and robust line orientation code (RLOC) [4], are implemented to ascertain performance comparison.

G.1.1 PolyU Contactless 2D/3D Palmprint Database

Figures 5A, 5B:
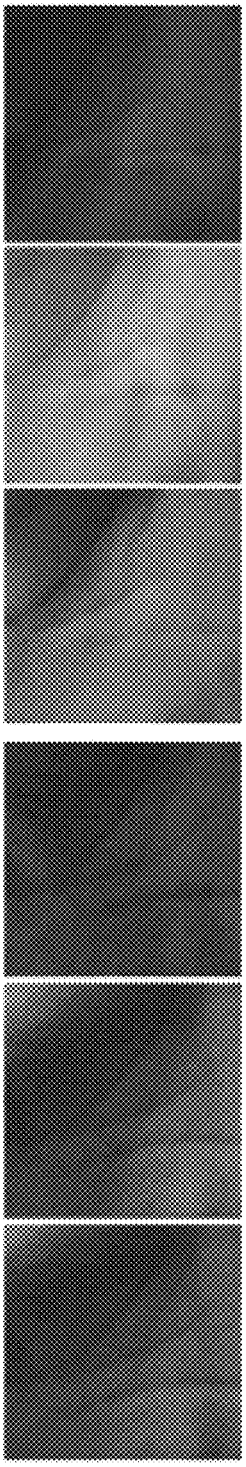
FIG. 5a depicts a first sample palmprint image.
FIG. 5b depicts a second sample palmprint image retrieved from the PolyU Contactless 2D/3D Palmprint Data-base and used in an experiment conducted to evaluate the identification and verification performance of the present invention.

This contactless palmprint database is acquired from 177 different subjects (right hand) and has 20 samples from each subject with 10 for 2D images and 10 for depth images. It also provides segmented palmprint image of 128×128 pixels. The experiments were performed on 2D part of this database. The 2D images were acquired under poor (ambient) illumination conditions and FIG. 5 depicts two sample images of two different subjects retrieved from this database.

In the experiment, the first five samples of each subject acquired during first session are enrolled as training set and the rest five from second session as the test set. There are 885 samples for training/gallery and 885 samples for the probe. The receiver operating characteristics (ROC), equal error rate (EER) and cumulative match characteristics (CMC) are used to evaluate the performance. Table 1 provides the EER and average rank-one recognition comparison with the three competing methods in the literature. FIGS. 6a and 6b depict their ROC and CMC curves respectively. The poor or ambient illumination in this database, along with contactless imaging, makes it most challenging among other databases. The experimental results from proposed method achieve outperforming results over other methods, both for the verification and identification performance.

TABLE 1

The EER and rank-one recognition accuracy from different methods on PolyU 2D/3D PaImprint Database

| Method | The present invention's | RLOC | CompCode | Ordinal Code |
|---|---|---|---|---|
| EER (%) | 0.72 | 1.7 | 0.82 | 1.2 |
| Accuracy (%) | 98.98 | 97.97 | 98.77 | 98.47 |

G.1.2 IITD Palmprint Database

The IITD touchless palmprint database provides contactless palmprint images from the right and left hands of 230 subjects. There are more than five samples for right hand or left hand images in this database, which also provides 150×150 pixels segmented palmprint images. All the 1,376 right hand palmprint images are employed for the experiments.

The IITD touchless palmprint database provides contactless palmprint images from the right and left hands of 230 subjects. There are more than five samples for right hand or left hand images in this database which also provides 150×150 pixels segmented palmprint images. All the 1,376 right hand palmprint images are employed for the experiments.

In the experiment, for each subject, one image is employed for the test and the rest of the images are employed for training and compute the average performance. The ROC, EER and CMC are used to ascertain the performance. Table 2 presents the EER and average rank-one recognition accuracy on this database using different methods. FIGS. 7a and 7b depict the corresponding ROC and CMC curves respectively. These comparative results also illustrate outperforming results from the proposed method using this database.

TABLE 2

The EER and average rank-one recognition accuracy from different methods on IITD Palmprint Database

| Method | The present invention's | RLOC | CompCode | Ordinal Code |
|---|---|---|---|---|
| EER (%) | 0.22 | 0.64 | 0.68 | 0.33 |
| Accuracy (%) | 100 | 99.77 | 99.21 | 99.77 |

G.1.3 PolyU Palmprint Database

Figure 8B:
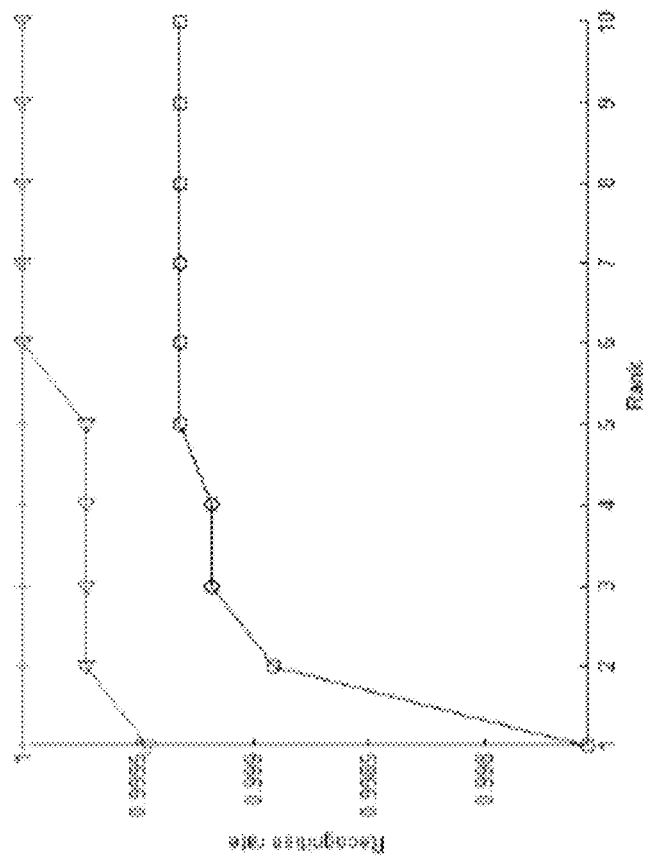
FIG. 8b depicts the CMC curve of the experiment conducted using sample palmprint images in the PolyU Palmprint Database.
Figure 8A:
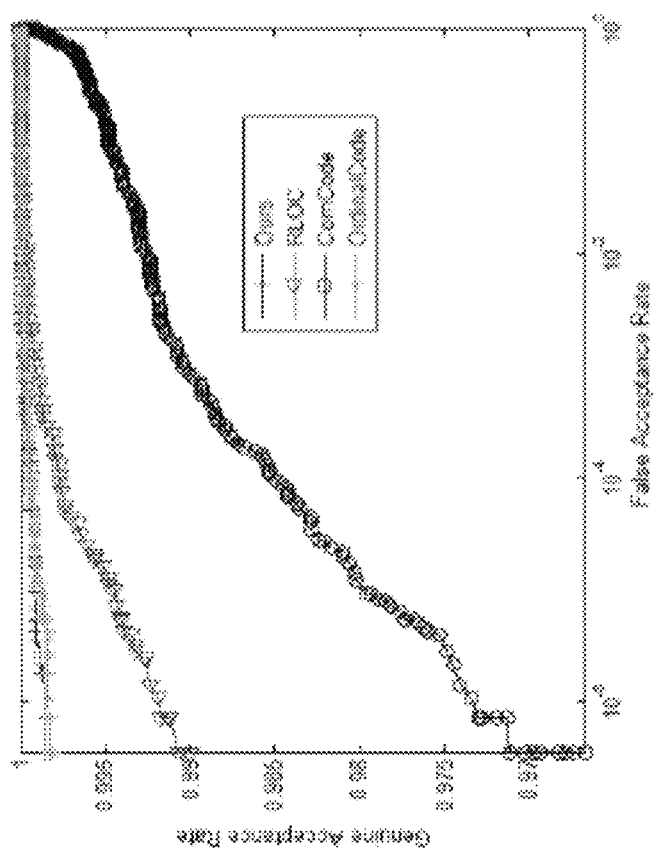
FIG. 8a depicts the ROC curve.

The PolyU palmprint database contains 7,752 palmprint images from 386 different palms. These images are automatically segmented to 128×128 size. In this database, there are several images, which are poorly aligned due to their rotational variation. In the experiments, the same protocol as reported in [4] is used. Only the first sample of each individual is used to construct the training set. The training set is enlarged by rotating each image in training set 9, 6, 3, −3, −6, −9 degrees respectively. Consequently, there are a total of seven training samples for each subject. FIGS. 8a and 8b depict respectively the comparative ROC and CMC performances in the experiments using RLOC, competitive code and ordinal code. Table 3 summarizes the EER and rank-one recognition accuracy from different methods.

TABLE 3

The EER and rank-one recognition accuracy from different methods on PolyU Palmprint Database

| Method | The present invention's | RLOC | CompCode | Ordinal Code |
|---|---|---|---|---|
| EER (%) | 0.033 | 0.089 | 0.076 | 0.038 |
| Accuracy (%) | 100 | 99.95 | 99.76 | 100 |

The achieved results from the method of the present invention and the ordinal code are better than the other two methods. In the PolyU Paimprint database, all the images are well illuminated and acquired under special contact based imaging device. It may therefore be noted that under such illumination conditions, what the ordinal code method represents is a special case in accordance to an embodiment of the present invention. However when the illumination is poor (say uncontrolled or ambient), the performance from ordinal code will significantly deteriorate. The results on the other three palmprint databases in this document (presented in Sections G.1.1-2 and G.1.4) also validate this argument.

G.1.4 CASIA Palmprint Database

The CASIA palmprint database contains 5,239 palmprint images from 301 individuals. It is the largest publicly available database in terms of the number of individuals. In this database, the individual "101" is the same as the individual "19" and therefore these two classes were therefore merged into one class. The 11$^{th}$ image from the left hand of individual "270" is also misplaced sample posted in the tight hand, The 3$^{rd}$ image from left hand of individual "76" is a distorted sample whose quality is very poor. These two samples can also be automatically detected by a palmprint segmentation program. These two images are eliminated in the experiment. Therefore, all experiments with this database employed 5,237 images belonging to 600 different palms.

Figure 9:
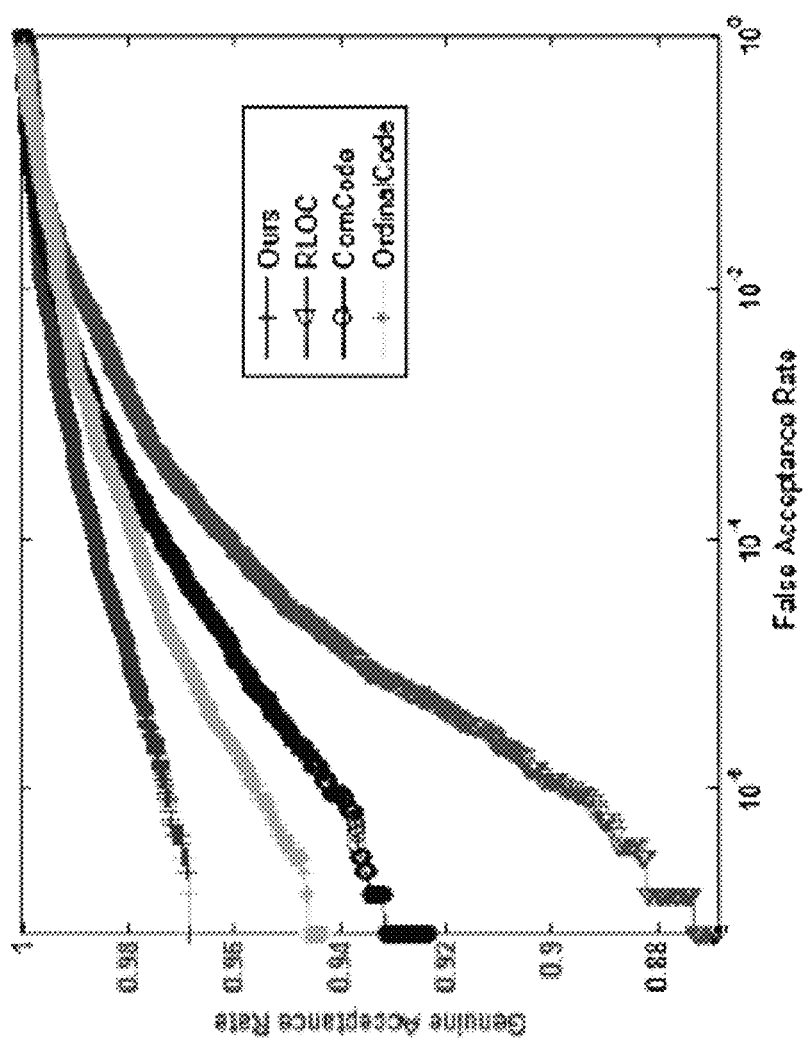
FIG. 9 depicts the ROC curve of the experiment conducted using sample palmprint images in the CASIA Palmprint Database.

The resulting images in the database to 128×128 pixels are segmented and scaled. The segmentation algorithm is based on the method reported in [11]. In the experiment, the total number of matches is 13,692,466, which includes 20,567 genuine and 13,689,899 imposter matches. FIG. 9 depicts the ROC results, RLOC, competitive code and ordinal code. Table 4 summarizes EER and rank-one accuracy of these methods. The method provided by the present invention significantly outperforms three state-of-art three methods considered in evaluation.

TABLE 4

Comparative results using (EER) CASIA Palmprint Database

| Method | The present invention's | RLOC | CompCode | Ordinal Code |
|---|---|---|---|---|
| EER (%) | 0.53 | 1.0 | 0.76 | 0.79 |

G.1.5 Computational Requirement and Discussion

Table 5 lists the computational time for the method provided by the present invention, RLOC [4], Competitive Code [6] and Ordinal Code [7]. The feature extraction speed of the method provided by the present invention is much faster than the Competitive Code, Ordinal Code and a little slower than RLOC. However, the matching speed of the method provided by the present invention is among the fastest while RLOC is much slower. Considering the feature extraction time and matching time, it can be concluded that the present invention also has a speed advantages.

TABLE 5

Comparative computational time requirements

| Method | Feature Extraction | Matching |
|---|---|---|
| The present invention's | 1.1 | 0.054 |
| RLOC | 0.13 | 1.2 |
| Competitive Code | 4.0 | 0.054 |
| Ordinal Code | 3.2 | 0.054 |

Note:
The experimental environment is: Microsoft® Windows® 8 Professional, Intel® Core™ i5-3210M CPU@2.50 GHz, 8G RAM, VS 2010.

The Ordinal code [8] can be considered as a special case of the developed feature of the present invention. For ordinal code, it uses three 2D Gaussian filters to perform convolution with the image. The difference is that the ordinal code assigns different values for the weight $W_{i,1}$ and $W_{i,2}$ in the Equation 8 while the developed feature of the present invention sets all the weights as one, which results in $\delta$ from Equation 8. As a result, the ordinal code output is not as orthogonal to the palmprint surface as from the method of the present invention. Thus, according to the earlier analysis, the recovery using ordinal code will be sensitive to the illumination changes. In the experiment on the PolyU Palmprint Database, all the images in this database are well illuminated, i.e., the illumination direction is orthogonal to palmprint surface. According to Equation 7, the recovered feature is determined by illumination direction and 3D shape information $\delta$; if illumination is orthogonal to palmprint surface, the recovered feature will be reliable. This is the reason why the method of the present invention achieves similar performance on the PolyU Palmprint Database as from the ordinal code. it may be noted that the ordinal measure [8] uses three times larger template size than the method of the present invention, however, the method provided by the present invention outperforms such ordinal measure.

G.2 Experimental Results from Face Recognition Applications

In this part of experiments, Extended Yale Face Database B [3] is employed to verify the effectiveness of the present invention for the face recognition. These experiments are intended to evaluate the effectiveness of the feature of the present invention to support[6] the arguments that the feature of the present invention is indeed describing the 3D shape information, which is insensitive to illumination changes. The Extended Yale Face Database B [3] is chosen to do identification primarily for the three reasons:

1) For face data, the surface of face is almost flatten similar to the palmprint surface. Therefore, the assumption of illumination directions made during the imaging (in FIG. 1) reasonably holds true.

2) There are few palmprint images acquired under extremely varying lighting conditions. In order to evaluate the effectiveness of the robustness of the feature of the present invention to illumination changes, this database is used, which has with extreme illumination changes (samples in FIG. 10).

3) The matching strategy of the method of the present invention is a simple point-to-point matching and can be sensitive to the surface deformations. The faces in this database do not contain any view or expression variations.

The Extended Yale Face Database B contains 38 subjects and each subject is imaged with 64 illumination conditions. The cropped faces with the resolution of 168×192 are also provided. In the experiment, the most neutral light sources (A+000E+00) images are used as the gallery, and all the other frontal images are used as probes (in summary, 38 images constituted the training set and 2,376 images are employed for the testing). This database is used to evaluate the identification performance.

[6] It may be noted that the identification considers relative matching score but not absolute matching score. In identification, the intra-class objects are expected to be more similar in shape information than inter-class ones. Since the feature of the present invention is encoding shape information, it is expected to have relatively (not absolutely because it cannot be assured the exact number of unreliable codes on certain matching since it depends on the feature extractor and whether the reliable constrain is satisfied as mentioned in previous part) more reliable codes than inter-class ones. The state-of-the-art performance from this experiment also supports above arguments.

No additional filter is designed according to the geometrical properties of the face surface but simply the same division strategy is used as for the palmprint. Besides, the denoising matching strategy is not employed to underline the robustness of the feature of the present invention to the extremely varying illumination conditions. Therefore in the matching stage, the distance computations in Equation (22) is replaced by:

$$\text{Distance}(F_T, F_S) = Dis(F_T, F_S) \tag{19}$$

The rank-one recognition accuracy is 99.3%. Table 5 summarizes the comparative results with another two state-of-art methods on this database. These results demonstrate that the developed feature of the present invention is also robust to the illumination changes and can validate the presented argument.

TABLE 6

Identification Rate Comparison with the State-of-Art Methods for Extended Yale Face Database B

| Method | The present invention's | PP + LTP/DT [15] | G-LDP [16] |
|---|---|---|---|
| Rank-one rate (%) | 99.3 | 99.0 | 97.9 |

Figure 10:
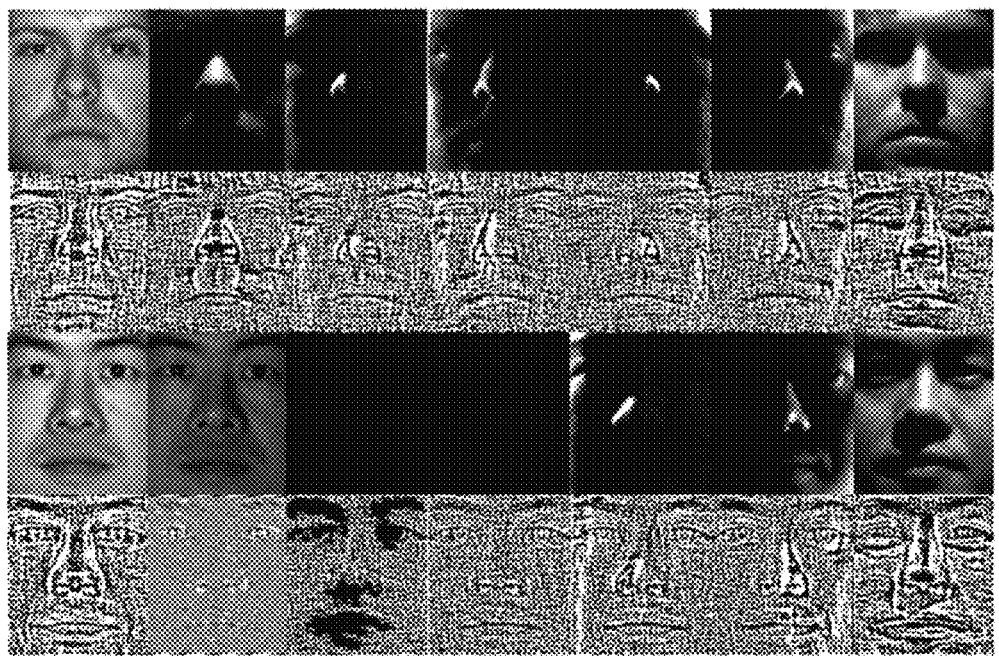
FIG. 10 shows the feature code of faces from the Extended Yale Face Database B.

FIG. 10 shows the feature code of faces from the Extended Yale Face Database B. The first row and third row are the original face images from two individuals. The first image of each row is the training sample and the remaining are probes. The second row and forth row are their corresponding feature codes from the method provided by the present invention.

The experiments also achieved similar outperforming results while matching Iris images (publicly available IUD Iris images Database) and Finger Knuckle images (using publicly available PolyU Contactless Finger Knuckle Images Database).

G.3 Experimental Results from Finger Knuckle Experiments

Figure 11A:
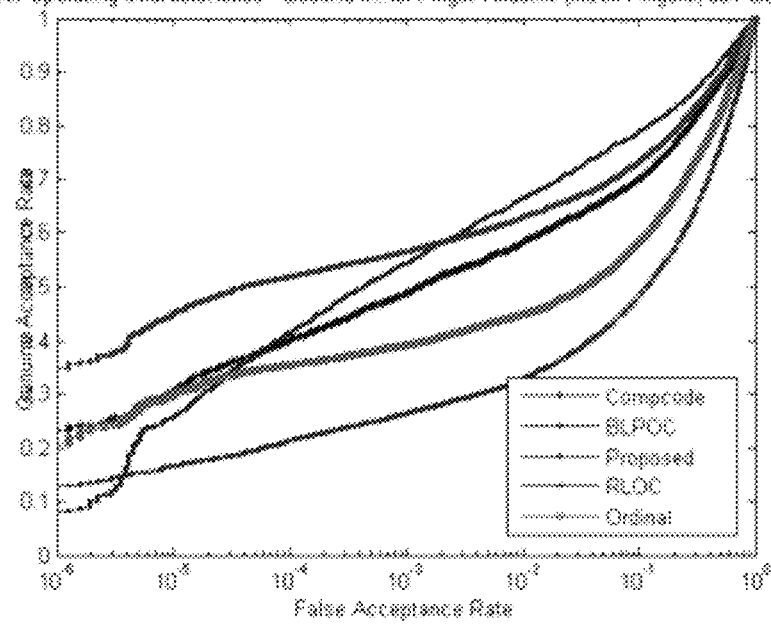
FIG. 11a depicts the ROC curve of an experiment conducted using finger knuckle images of index fingers from 501 subjects.
Figure 11B:
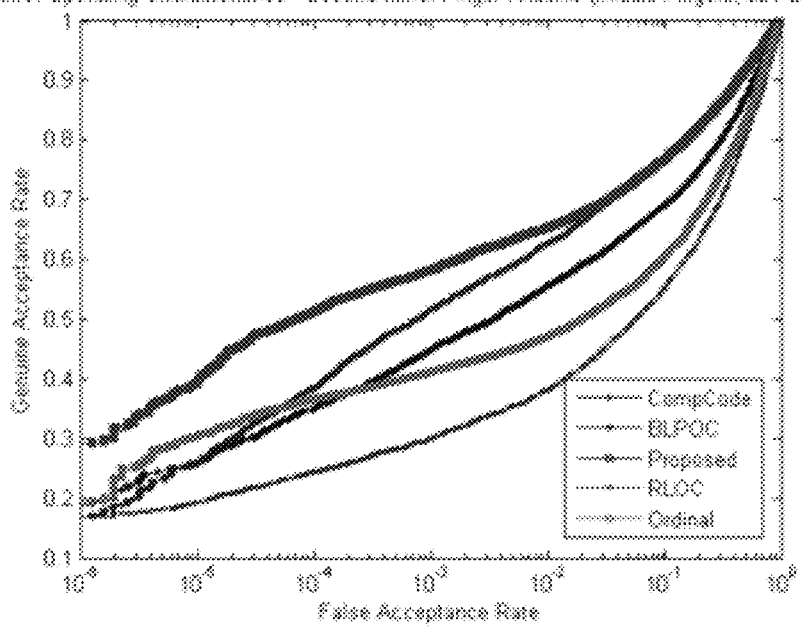
FIG. 11b depicts the ROC curve of a similar experiment conducted using finger knuckle images of middle fingers from the 501 subjects.
Figure 12A:
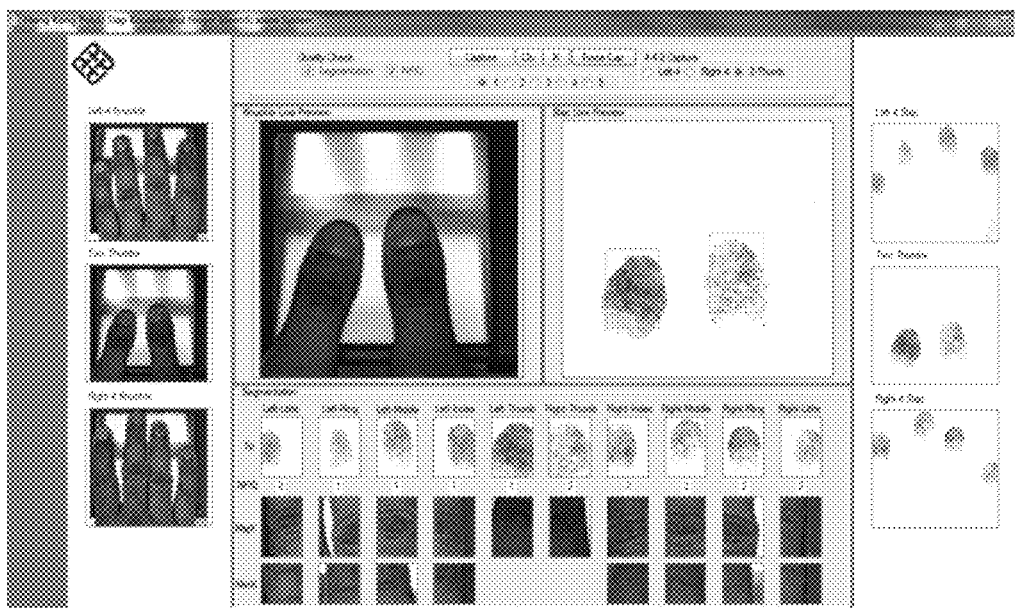
FIG. 12a shows a graphical user interface of a joint finger-knuckle and fingerprint system in accordance to one embodiment of the present invention.
Figure 12B:
FIG. 12b shows a photograph of an imaging device connected to a slap-fingerprint scanner for simultaneous finger knuckle imaging with fingerprint in accordance to one embodiment of the present invention.

In this part of experiments, finger knuckle images from 501 subjects are employed to comparatively ascertain the performance. The experimental results using receiver operating characteristics are illustrated in FIG. 11 and confirm the superiority of developed method over existing methods [17] in the literature. it should be noted that the method provided by the present invention is also significantly faster (Table 5) than other existing methods. FIG. 12 illustrates the graphical user interface and imaging interface of the joint fingerprint and finger knuckle system using this invention.

H. CONCLUSIONS

The present invention provides a new method of contactless biometrics identification using 2D images. In accordance to one embodiment, a new feature, which is based on ordinal measure is developed. This feature recovers 3D shape information of the surface while it is extracted from pixel level information in the contactless images. The feature extraction and matching is very efficient and the implementation is simple, which emphasizes on its practicality. The template size from this feature is also very small while it achieves excellent performances on multiple biometrics databases.

The developed feature is suitable to be integrated with other features to further improve the matching performance due to two key reasons: 1) it has lower storage requirements while being efficient to recover/extract and match, and most importantly its effectiveness in achieving accurate performance, 2) most of the 2D features mentioned in previous sections extract the texture information while the developed feature of the present invention recovers 3D shape information, which means it is likely to have less redundancy with other features.

The prototype of hand dorsal image based system using the invented feature achieves excellent performance on finger knuckle biometric matching. The present invention has successfully developed joint add-on system which can be integrated with existing slap fingerprint devices, or work as standalone, to reveal additional matches from knuckle biometrics for enhancing accuracy from fingerprint based matches.

The embodiments disclosed herein may be implemented using general purpose or specialized computing devices, computer processors, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

In some embodiments, the present invention includes computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. it is intended that the scope of the invention be defined by the following claims and their equivalence.

What is claimed is:

1. A computer implemented method for performing biometrics identification, comprising:
    acquiring one or more biometrics images of a person;
    extracting one or more features using a specially designed filter for recovering three-dimensional (3D) shape information from the biometric images to generate an acquired original feature template;
    denoising the acquired original feature template to generate an acquired denoised feature template; and
    generating a consolidated match score using a combination of a first weighted distance between the acquired original feature template and a stored original feature template, and a second weighted distance between the acquired denoised feature template and a stored denoised feature template;
    wherein the stored original feature template is generated from a previously acquired one or more biometrics images of a person and stored in a registration database; and
    wherein the stored denoised feature template is generated from denoising the stored original feature template and stored in the registration database.

2. The method according to claim 1, wherein the biometric images being aligned to locate one or more common regions using special domain techniques or spectral domain techniques.

3. The method according to claim 2,
    wherein the special domain techniques include correlation; and
    wherein the spectral domain techniques include 2D FFT.

4. The method according to claim 1, wherein biometric modality in the biometric images represent two-dimensional (2D) information including iris, palmprint, face, and finger knuckle, or 3D information.

5. The method according to claim 1, wherein the consolidated match score is generated using a dynamic combination of a first distance between the acquired original feature template and a stored original feature template, and a second distance between the acquired denoised feature template and a stored denoised feature template.

6. The method according to claim 1, where a mobile phone is used to acquire the biometric images under multiple illuminations using one or more illumination sources including natural or ambient light source, LED, and camera flash.

7. The method according to claim 1, wherein the acquisition of the biometrics images of a person comprising automatically and simultaneously acquiring hand dorsal images containing one or more finger knuckle patterns, and one or more fingerprint images.

8. The method according to claim 1, wherein the acquisition of the biometrics images comprising using a slap-fingerprint system to acquire one or more fingerprint images along with the acquisition of hand dorsal images.

9. The method according to claim 8, wherein a first consolidated match score corresponding to the acquired fingerprint images and a second consolidated match score corresponding to the acquired hand dorsal images are combined to more reliably identify the person.

10. A device for biometrics identification, comprising:
a first means to automatically and simultaneously acquire hand dorsal images containing one or more finger knuckle patterns and one or more fingerprint images; and
a computing device to identify a person using the method according to claim 1.

11. A system for biometrics identification, comprising:
a slap-fingerprint system for acquiring one or more fingerprint images; and
a computing device for acquiring one or more hand dorsal images and identifying a person using the method according to claim 1 with the input of the fingerprint images and the hand dorsal images:
wherein the fingerprint images and the hand dorsal images are acquired simultaneously.

12. The system according to claim 11, wherein a first consolidated match score corresponding to the acquired fingerprint images and a second consolidated match score corresponding to the acquired hand dorsal images are combined to more reliably identify the person.

* * * * *